US011075674B2

(12) United States Patent
Hakola et al.

(10) Patent No.: US 11,075,674 B2
(45) Date of Patent: Jul. 27, 2021

(54) METHOD, SYSTEM AND APPARATUS

(71) Applicant: NOKIA SOLUTIONS AND NETWORKS OY, Espoo (FI)

(72) Inventors: Sami-Jukka Hakola, Kempele (FI); Esa Tapani Tiirola, Kempele (FI); Kari Pekka Pajukoski, Oulu (FI); Henrik Christian Liljestrom, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 174 days.

(21) Appl. No.: 15/780,780

(22) PCT Filed: Dec. 2, 2015

(86) PCT No.: PCT/EP2015/078291
§ 371 (c)(1),
(2) Date: Jun. 1, 2018

(87) PCT Pub. No.: WO2017/092797
PCT Pub. Date: Jun. 8, 2017

(65) Prior Publication Data
US 2020/0127708 A1    Apr. 23, 2020

(51) Int. Cl.
*H04B 7/0413*    (2017.01)
*H04B 1/40*    (2015.01)
(Continued)

(52) U.S. Cl.
CPC ............. *H04B 7/0413* (2013.01); *H04B 1/40* (2013.01); *H04B 7/022* (2013.01); *H04L 5/005* (2013.01); *H04L 5/0053* (2013.01); *H04W 88/06* (2013.01)

(58) Field of Classification Search
CPC ........ H04B 7/0413; H04B 7/022; H04B 1/40; H04W 88/06; H04L 5/005; H04L 5/0053
See application file for complete search history.

(56) References Cited

U.S. PATENT DOCUMENTS

2007/0280372 A1\* 12/2007 Egri .................... H04L 27/2637
375/267
2013/0077572 A1\* 3/2013 Lo ......................... H01Q 25/00
370/328
(Continued)

FOREIGN PATENT DOCUMENTS

CN      101079969 A    11/2007
CN      102932888 A    2/2013
(Continued)

OTHER PUBLICATIONS

Jedda et al., Spectral shaping with low resolution signals, 2015, IEEE, pp. 1435-1441. (Year: 2015).\*
(Continued)

*Primary Examiner* — Kabir A Timory
(74) *Attorney, Agent, or Firm* — Brake Hughes Bellermann LLP

(57) ABSTRACT

There is provided a method comprising, in an antenna array comprising a plurality of antenna elements for use in a multiple-input multiple-output system, using at least one receiver for reception of at least one first signal by at least one of the plurality of antenna elements and using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

19 Claims, 10 Drawing Sheets

(51) Int. Cl.
  *H04B 7/022* (2017.01)
  *H04L 5/00* (2006.01)
  *H04W 88/06* (2009.01)

(56) References Cited

U.S. PATENT DOCUMENTS

2014/0307654 A1* 10/2014 Kim .................... H04B 7/0617
                                                      370/329
2014/0307815 A1* 10/2014 Alex ................... H04B 7/0413
                                                      375/267
2015/0326285 A1    11/2015 Zirwas et al.
2016/0134415 A1*  5/2016 Chen .......................... H04L 5/16
                                                      370/277

FOREIGN PATENT DOCUMENTS

CN       105099533 A    11/2015
EP         2919530 A1    9/2015

OTHER PUBLICATIONS

3GPP TR 37.842 V1.0.0 (Sep. 2014), 3rd Generation Partnership Project; Technical Specification Group Radio Access Network; E-UTRA and UTRA; Radio Frequency requirement background for Active Antenna System Base Station (Release 12) Sep. 2014, 29 pages.
Mo et al., "High SNR Capacity of Millimeter Wave MIMO systems with One-Bit Quantization"; The University of Texas; (18 pages).
International Search Report and Written Opinion for International Application PCT/EP2015/078291, dated Aug. 25, 2016, 11 pages.
Office Action for Korean Application No. 10-2018-7018732, dated Dec. 18, 2019, 9 pages.
Office Action for Chinese Application No. 2015800857313, dated Oct. 9, 2019, 9 pages.
Second Office Action for Chinese Application No. 201580085731.3, dated Jun. 1, 2020, 9 pages.
Office Action for European Application No. 15804113.7, dated Jan. 15, 2021, 5 pages.

* cited by examiner

METHOD, SYSTEM AND APPARATUS

CROSS-REFERENCE TO RELATED APPLICATIONS

This application is a national stage entry of PCT Application No. PCT/EP2015/078291 filed Dec. 2, 2015, entitled "METHOD, SYSTEM AND APPARATUS" which is hereby incorporated by reference in its entirety.

FIELD

The present application relates to a method, apparatus, system and computer program and in particular but not exclusively to transceiver architecture for massive multiple-input multiple-output systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. Another proposed communication system is a 5G network

SUMMARY

In a first aspect there is provided a method comprising in an antenna array comprising a plurality of antenna elements for use in a multiple-input multiple-output system, using at least one receiver for reception of at least one first signal by at least one of the plurality of antenna elements and using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

The method may comprise using at least one transmitter for transmission of at least one first signal by at least one of the plurality of antenna elements, wherein the at least one transmitter operates using at least one of a lower accuracy and a narrower bandwidth relative to the at least one first transceiver.

Of the at least one receiver, the at least one transmitter and the at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The method may comprise causing transmission of at least one antenna specific signal, using the at least one transmitter.

The method may comprise receiving at least one antenna specific signal, using the at least one receiver.

The method may comprise using the at least one first signal for at least one channel estimation towards a base station and antenna synchronisation with the base station.

The at least one receiver may comprise a 1-bit analog-to-digital converter.

The at least one transmitter may comprise a 1-bit digital-to-analog converter.

The at least one transmitter may operate using a lower maximum power than the at least one first transceiver.

The number of the receivers may be greater than the number of the first transceivers. The number of antenna elements may be greater than or equal to the number of the number of the receivers.

The at least one receiver may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a second aspect there is provided a method comprising at a user device having a plurality of antenna elements for use in a multiple-input multiple-output system, using at least one transmitter for transmission of at least one first signal by at least one of the plurality of antenna elements and using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

The method may comprise using at least one receiver for receiving at least one first signal by at least one of the plurality of antenna elements, wherein the at least one receiver operates using at least one of a lower accuracy and a narrower bandwidth relative to the at least one first transceiver.

Of the at least one receiver, the at least one transmitter and at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The method may comprise receiving at least one antenna specific signal, using the at least one receiver.

The method may comprise causing transmission of at least one antenna specific signal, using the at least one transmitter.

The at least one transmitter may comprise a 1-bit digital-to-analog converter.

The at least one receiver may comprise a 1-bit analog-to-digital converter.

The at least one transmitter may operate using a lower maximum power than the at least one first transceiver.

The number of transmitters may be greater than the number of first transceivers. The number of antenna elements may be greater than or equal to the number of the number of transmitters.

The at least one transmitter may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a third aspect, there is provided an apparatus, said apparatus comprising means for, in an antenna array comprising a plurality of antenna elements for use in a multiple-input multiple-output system, using at least one receiver for reception of at least one first signal by at least one of the plurality of antenna elements and means for using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

The apparatus may comprise means for using at least one transmitter for transmission of at least one first signal by at least one of the plurality of antenna elements, wherein the at least one transmitter operates using at least one of a lower accuracy and a narrower bandwidth relative to the at least one first transceiver.

Of the at least one receiver, the at least one transmitter and the at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The apparatus may comprise means for causing transmission of at least one antenna specific signal, using the at least one transmitter.

The apparatus may comprise means for receiving at least one antenna specific signal, using the at least one receiver.

The apparatus may comprise means for using the at least one first signal for at least one channel estimation towards a base station and antenna synchronisation with the base station.

The at least one receiver may comprise a 1-bit analog-to-digital converter.

The at least one transmitter may comprise a 1-bit digital-to-analog converter.

The at least one transmitter may operate using a lower maximum power than the at least one first transceiver.

The number of the receivers may be greater than the number of the first transceivers. The number of antenna elements may be greater than or equal to the number of the number of the receivers.

The at least one receiver may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a fourth aspect, there is provided an apparatus, said apparatus comprising means for, at a user device having a plurality of antenna elements for use in a multiple-input multiple-output system, using at least one transmitter for transmission of at least one first signal by at least one of the plurality of antenna elements and means for using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

The apparatus may comprise means for using at least one receiver for receiving at least one first signal by at least one of the plurality of antenna elements, wherein the at least one receiver operates using at least one of a lower accuracy and a narrower bandwidth relative to the at least one first transceiver.

Of the at least one receiver, the at least one transmitter and at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The apparatus may comprise means for receiving at least one antenna specific signal, using the at least one receiver.

The apparatus may comprise means for causing transmission of at least one antenna specific signal, using the at least one transmitter.

The at least one transmitter may comprise a 1-bit digital-to-analog converter.

The at least one receiver may comprise a 1-bit analog-to-digital converter.

The at least one transmitter may operate using a lower maximum power than the at least one first transceiver.

The number of transmitters may be greater than the number of first transceivers. The number of antenna elements may be greater than or equal to the number of the number of transmitters.

The at least one transmitter may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a fifth aspect there is provided an apparatus comprising at least one processor and at least one memory including a computer program code, the at least one memory and the computer program code configured to, with the at least one processor, cause the apparatus at least to, in an antenna array comprising a plurality of antenna elements for use in a multiple-input multiple-output system, use at least one receiver for reception of at least one first signal by at least one of the plurality of antenna elements and use at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

The apparatus may be configured to use at least one transmitter for transmission of at least one first signal by at least one of the plurality of antenna elements, wherein the at least one transmitter operates using at least one of a lower accuracy and a narrower bandwidth relative to the at least one first transceiver.

Of the at least one receiver, the at least one transmitter and the at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The apparatus may be configured to cause transmission of at least one antenna specific signal, using the at least one transmitter.

The apparatus may be configured to receive at least one antenna specific signal, using the at least one receiver.

The apparatus may be configured to use the at least one first signal for at least one channel estimation towards a base station and antenna synchronisation with the base station.

The at least one receiver may comprise a 1-bit analog-to-digital converter.

The at least one transmitter may comprise a 1-bit digital-to-analog converter.

The at least one transmitter may operate using a lower maximum power than the at least one first transceiver.

The number of the receivers may be greater than the number of the first transceivers. The number of antenna elements may be greater than or equal to the number of the number of the receivers.

The at least one receiver may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a sixth aspect there is provided an apparatus comprising at least one processor and at least one memory including a computer program code, the at least one memory and the computer program code configured to, with the at least one processor, cause the apparatus at least to, at a user device having a plurality of antenna elements for use in a multiple-input multiple-output system, using at least one transmitter for transmission of at least one first signal by at least one of the plurality of antenna elements and using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

The apparatus may be configured to use at least one receiver for receiving at least one first signal by at least one of the plurality of antenna elements, wherein the at least one receiver operates using at least one of a lower accuracy and a narrower bandwidth relative to the at least one first transceiver.

Of the at least one receiver, the at least one transmitter and at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The apparatus may be configured to receive at least one antenna specific signal, using the at least one receiver.

The apparatus may be configured to cause transmission of at least one antenna specific signal, using the at least one transmitter.

The at least one transmitter may comprise a 1-bit digital-to-analog converter.

The at least one receiver may comprise a 1-bit analog-to-digital converter.

The at least one transmitter may operate using a lower maximum power than the at least one first transceiver.

The number of transmitters may be greater than the number of first transceivers. The number of antenna elements may be greater than or equal to the number of transmitters.

The at least one transmitter may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In a seventh aspect there is provided a computer program embodied on a non-transitory computer-readable storage medium, the computer program comprising program code for controlling a process to execute a process, the process comprising in an antenna array comprising a plurality of antenna elements for use in a multiple-input multiple-output system, using at least one receiver for reception of at least one first signal by at least one of the plurality of antenna elements and using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

The process may comprise using at least one transmitter for transmission of at least one first signal by at least one of the plurality of antenna elements, wherein the at least one transmitter operates using at least one of a lower accuracy and a narrower bandwidth relative to the at least one first transceiver.

Of the at least one receiver, the at least one transmitter and the at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The process may comprise causing transmission of at least one antenna specific signal, using the at least one transmitter.

The process may comprise receiving at least one antenna specific signal, using the at least one receiver.

The process may comprise using the at least one first signal for at least one channel estimation towards a base station and antenna synchronisation with the base station.

The at least one receiver may comprise a 1-bit analog-to-digital converter.

The at least one transmitter may comprise a 1-bit digital-to-analog converter.

The at least one transmitter may operate using a lower maximum power than the at least one first transceiver.

The number of the receivers may be greater than the number of the first transceivers. The number of antenna elements may be greater than or equal to the number of the number of the receivers.

The at least one receiver may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In an eighth aspect there is provided a computer program embodied on a non-transitory computer-readable storage medium, the computer program comprising program code for controlling a process to execute a process, the process comprising at a user device having a plurality of antenna elements for use in a multiple-input multiple-output system, using at least one transmitter for transmission of at least one first signal by at least one of the plurality of antenna elements and using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

The process may comprise using at least one receiver for receiving at least one first signal by at least one of the plurality of antenna elements, wherein the at least one receiver operates using at least one of a lower accuracy and a narrower bandwidth relative to the at least one first transceiver.

Of the at least one receiver, the at least one transmitter and at least one first transceiver, only the at least one first transceiver may be used to transmit and receive scheduled user data.

The at least one first signal may comprise at least one of physical control channels and reference signals.

The at least one of reference signals and a physical control channels may comprise at least one of uplink sounding reference signals, uplink channel state information reference signals, uplink demodulation reference signals, uplink physical random access channel, uplink scheduling request signalling, hybrid automatic repeat requests acknowledgment and channel quality information.

The process may comprise receiving at least one antenna specific signal, using the at least one receiver.

The process may comprise causing transmission of at least one antenna specific signal, using the at least one transmitter.

The at least one transmitter may comprise a 1-bit digital-to-analog converter.

The at least one receiver may comprise a 1-bit analog-to-digital converter.

The at least one transmitter may operate using a lower maximum power than the at least one first transceiver.

The number of transmitters may be greater than the number of first transceivers. The number of antenna elements may be greater than or equal to the number of the number of transmitters.

The at least one transmitter may be associated with a respective one of the plurality of antenna elements.

The at least one first signal may comprise antenna signals. The at least one second signal may comprise beam signals.

The antenna signals may have a radiation pattern covering a cell. The beam signals may have a radiation portion covering a portion of the cell.

The at least one first signal may comprise constant envelope sounding signals.

In an aspect there is provided a computer program product for a computer, comprising software code portions for performing the steps the method of the first aspect and/or the second aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
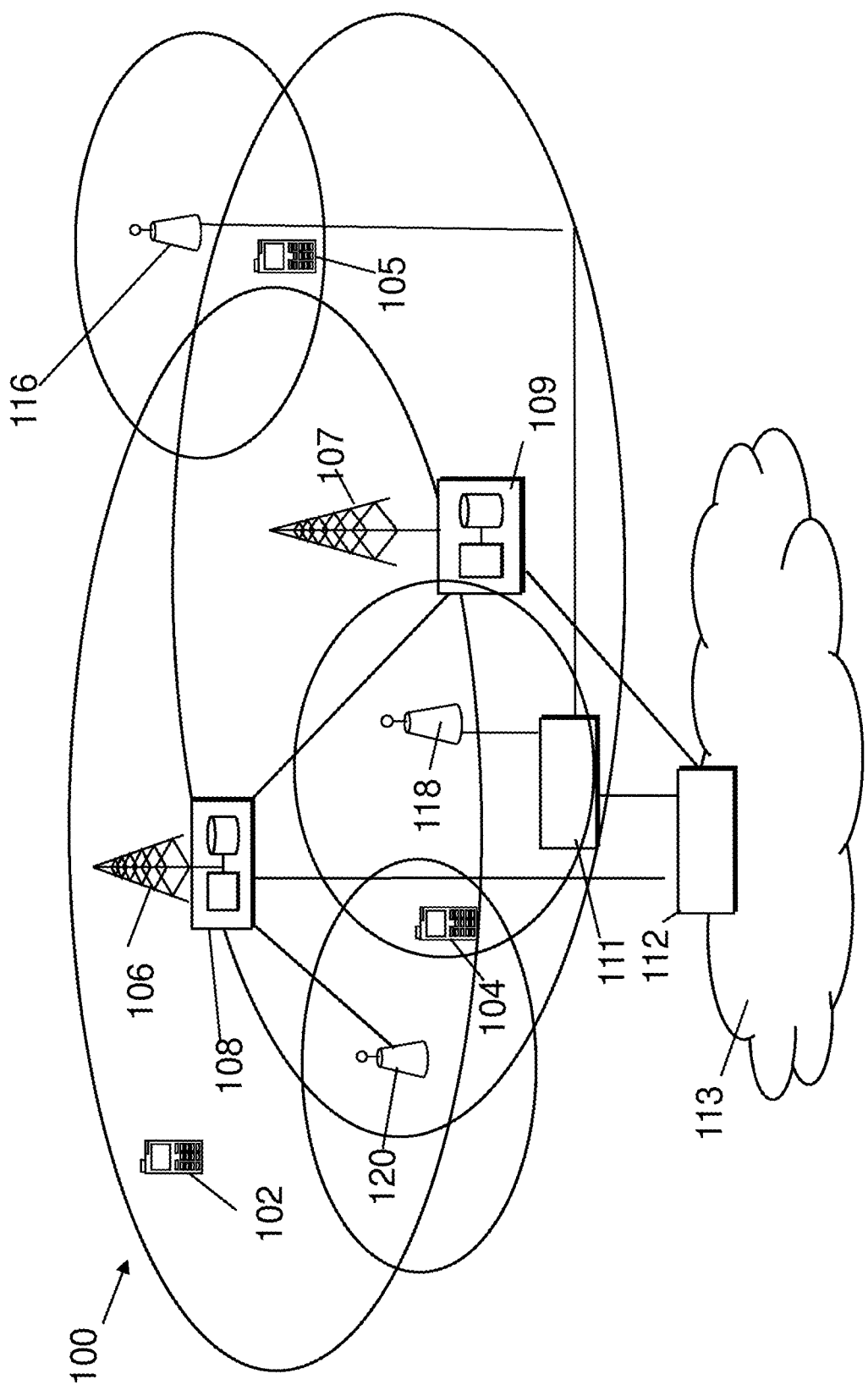
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
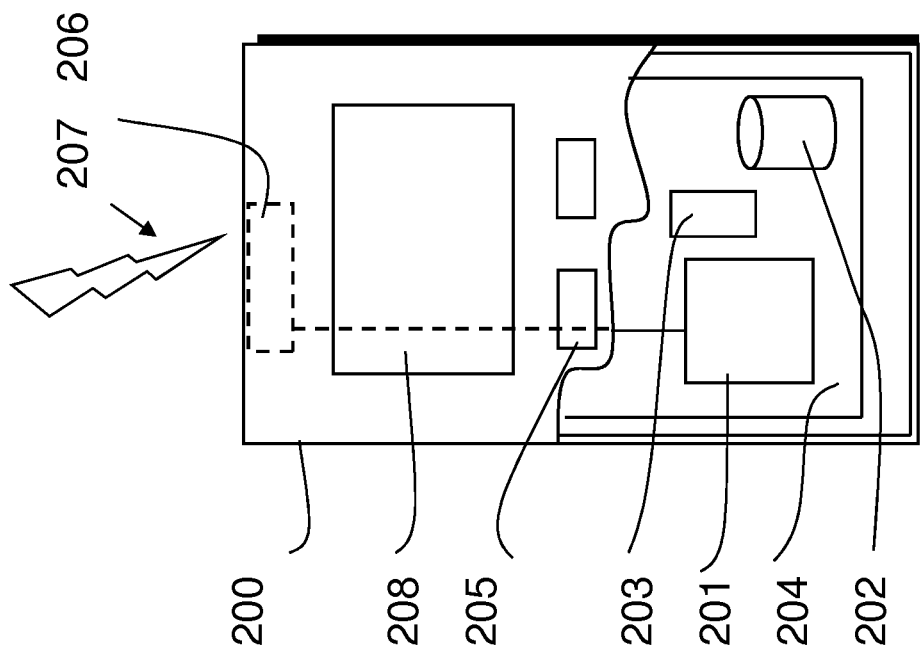
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on (including different combinations of those). Signalling mechanisms and procedures, which may enable a device to address in-device coexistence (IDC) issues caused by multiple transceivers, may be provided with help from the network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

The embodiments are not, however, restricted to the system given as an example but a person skilled in the art may apply the solution to other communication systems provided with necessary properties. Another example of a suitable communications system is the 5G concept. Network architecture in 5G may be similar to that of the LTE-advanced. 5G may use multiple input-multiple output (MIMO) antennas, many more base stations or nodes than the LTE (a so-called small cell concept), including macro sites operating in cooperation with smaller stations and perhaps also employing a variety of radio technologies for better coverage and enhanced data rates.

It should be appreciated that future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

The following relates to 5G radio access, in particular to transceiver (TRX) architectures for massive Multiple-Input Multiple-Output (MIMO) arrays.

5G radio access systems may be utilized on cmWave (3-30 GHz) and mmWave (30 GHz→) carrier frequencies.

Figure 3:
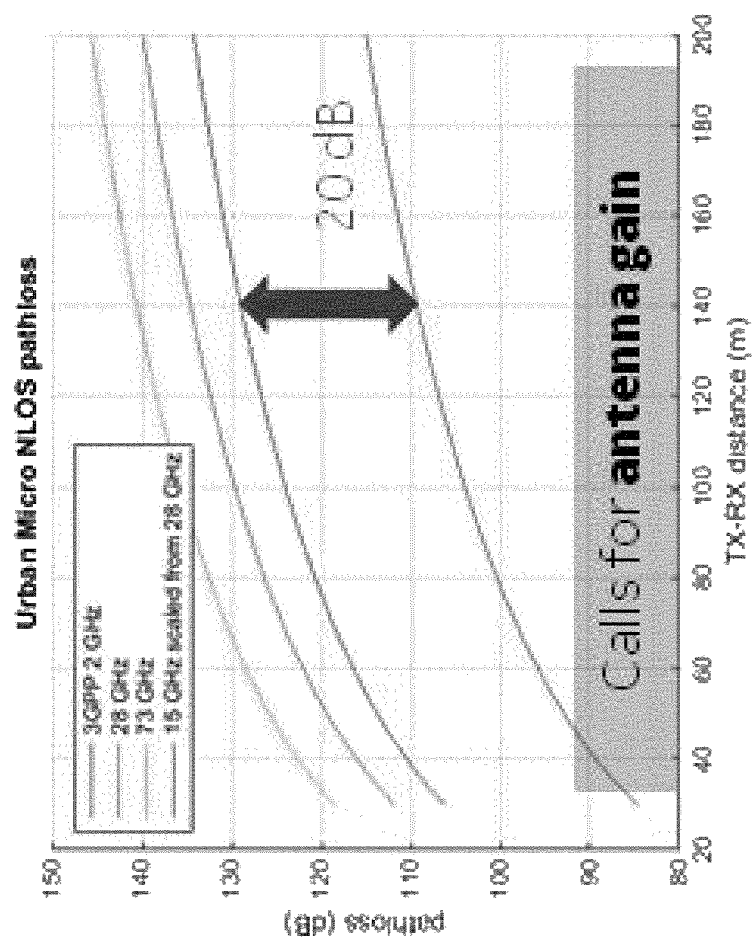
FIG. 3 shows pathloss against TX-RX distance for 2, 15, 28 and 73 GHz carrier frequencies in one exemplary scenario.

Typical deployment scenarios in cmWave and mmWave frequencies may include dense urban micro nodes with inter-site distances of up to 200 m and BS antenna heights below rooftop level (~10 m). To compensate for increased pathloss when going towards higher carrier frequencies, deployed systems may rely on beamforming (antenna gain) with a high number of antenna elements. As an example, FIG. 3 illustrates the need for additional antenna gain when carrier frequency is increased from 2 GHz to 15, 28 or 73 GHz.

On the other hand, as carrier frequency increases, more antenna elements may be integrated into one antenna unit with the same physical size. Hence, from form factor point of view, an increase of the number of antenna elements with higher frequencies is feasible. Achievable output power of a single power amplifier tends to decrease as a function of carrier frequency. Thus architectures in which each antenna element is equipped with a power amplifier (PA) may be desirable because they are able to provide high total output power.

Figure 4:
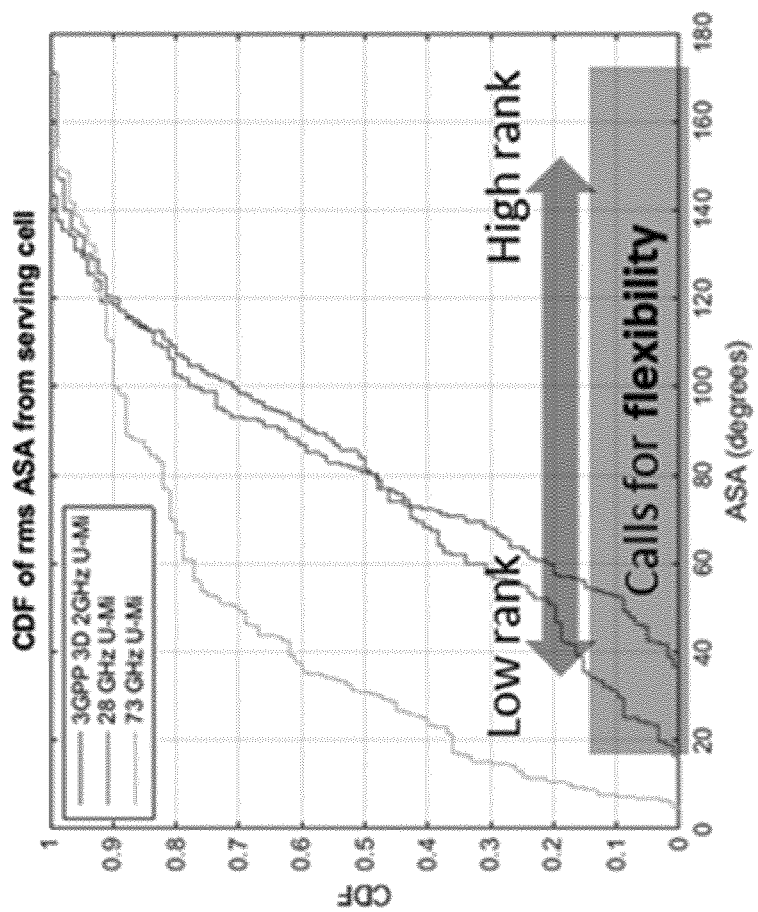
FIG. 4 shows RMS azimuth spread of arrival angles for 2, 28 and 73 GHZ carrier frequencies in one exemplary scenario.

Generally, the multiplexing capability of a MIMO channel increases with the angular spread of the signal. Typically, both root mean square (rms) delay spread and rms angular spread tend to decrease as a function of carrier frequency. However, 28 GHz urban micro deployment may provide a wide angular spread comparable to a corresponding system on 2 GHz carrier frequency, which indicates a need for flexibility between low and high rank transmissions as depicted in FIG. 4.

That is, cmWave and mmWave systems may support both high spatial multiplexing capability and high antenna gains. Spatial multiplexing support in, e.g., LTE may be determined by the number of antenna ports configured for physical downlink shared channel and maximum available antenna/beamforming gain may depend on the number of antenna elements.

Figure 6:
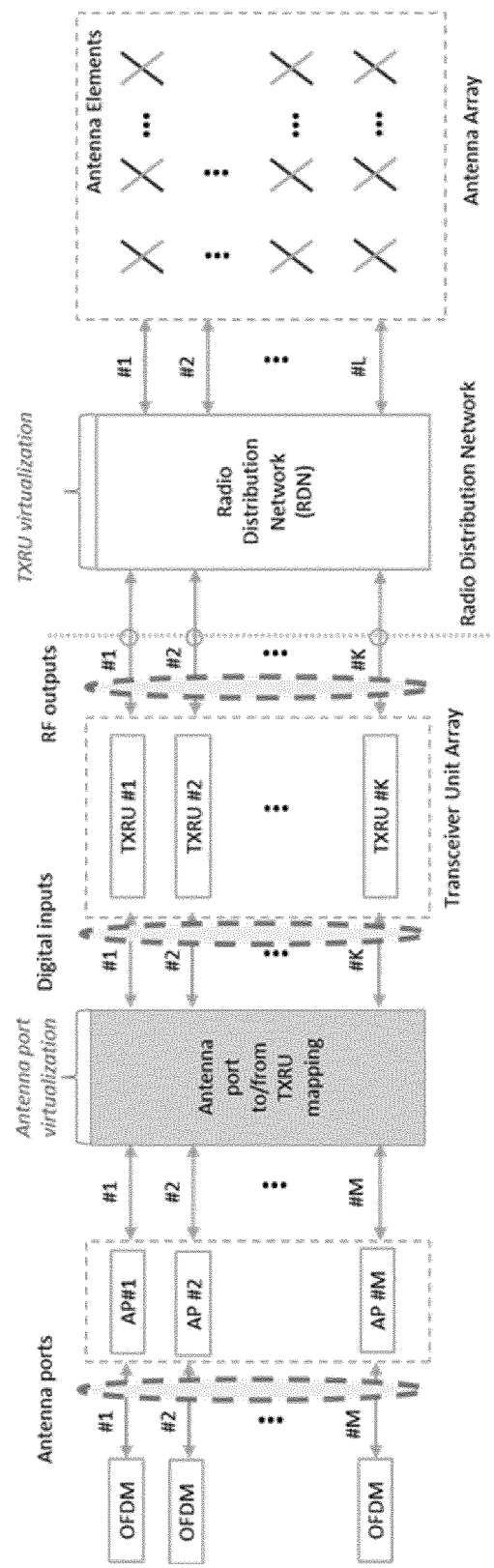
FIG. 6 shows an example framework for radio architecture.

FIG. 6 shows an example framework for a radio architecture.

One TXRU may be connected to {1 . . . L} antenna elements depending on the TXRU virtualization, i.e. mapping between TXRUs and Antenna Elements. Mapping can be either sub-array or full connection. In sub-array mapping, one TXRU is connected to subset of antenna elements where different subsets are disjoint. In full connection mapping each TXRU is connected to each antenna element.

Radio distribution network (RDN) performs antenna virtualization in the RF domain. Virtualization is not frequency selective but common to REs (& UEs). RDN may utilize either sub array or full connection mapping between TXRUs and Antenna Elements.

In the transmitting direction, M antenna ports feed K TXRUs, and K TXRUs feed L antenna elements where M≤K≤L.

The framework can be used to describe digital beamforming, hybrid beamforming and analog beamforming systems.

Digital adaptive antenna systems (AAS) may comprise one or more spatial layers per UE and use digital precoding only. In digital AAS, the number of TXRUs is equal to the number of antenna elements (K=L) and the number of antenna ports is less than the number of TXRUs (MK). That is, one-to-one mapping from TXRU to antenna element is used.

In analog AAS one spatial layer per UE is used. No digital precoding is performed, only analog beamforming. In analog AAS, M=1, K<L. There is one-to-many mapping from TXRU to antenna element.

In hybrid AAS there is one or more spatial layers per UE. Both analog and digital beamforming are involved. In hybrid AAS, K<L and M≤K. There is one-to-many mapping from TXRU to antenna element.

Figure 5:
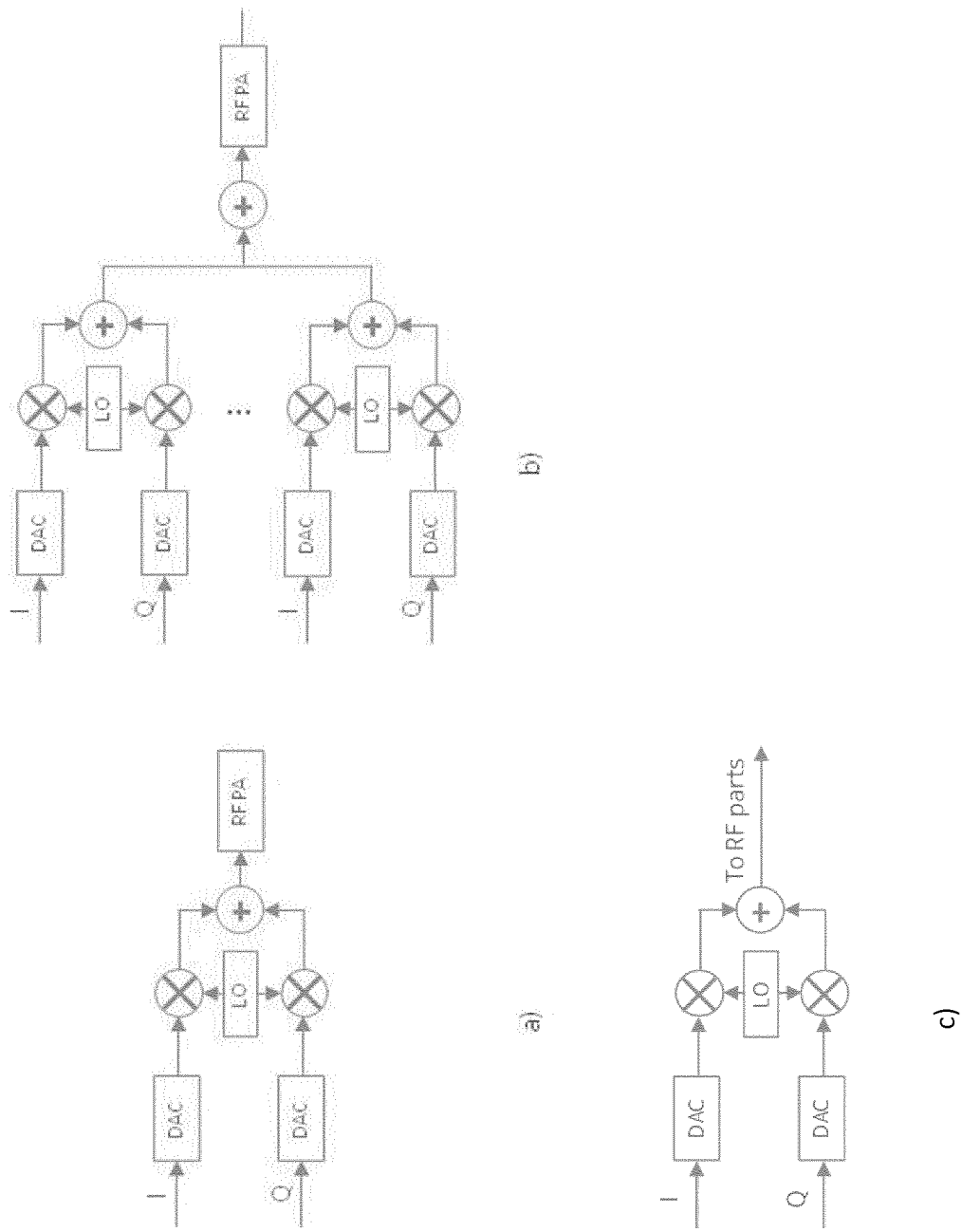
FIG. 5a shows an example framework of a transmission unit.
FIG. 5b shows an example framework of a transmission unit.
FIG. 5c shows an example framework of a transmission unit.

A transceiver unit (TXRU) may comprise both a Transmitter Unit (TXU) and a Receiver Unit (RXU). TXRU transforms baseband (BB) inputs (I & Q) to radio frequency (RF) outputs. FIGS. 5a, 5b and 5c shows examples of a transmitter unit (TXU). The TXU may also comprise a digital-to-analog converter (DAC), a local oscillator (LO) and a power amplifier (PA). Correspondingly an RXU may comprise an analog-to-digital converter (ADC) in place of a DAC and a low noise amplifier (LNA) in place of a PA. In the following, the terms ADC and DAC are used interchangeably to refer to an apparatus or means for converting between analog and digital signals.

The example TXU shown in FIG. 5a comprises one I&Q digital input and a PA. This TXU type may be typical for data transmission of high order modulation signals due to cost issues: in order to keep power consumption of high accuracy DACs and complexity of PA linearization at a feasible level.

The example TXU shown in FIG. 5b comprises multiple digital I&Q inputs and a common PA. This option may be attractive for example for the transmissions constant envelope signals that would allow usage of low accuracy DACs as well as simple PA linearization even with multiple I&Q digital inputs. For instance, when lookup table (LUT) based PA predistortion is utilized, a very simple LUT for predistortion function may be used.

FIG. 5c shows an example TXU comprising a distributed PA architecture (i.e. PA per antenna element), such that PA is not part of TXRU.

Complexity and power consumption of baseband processing may limit the number of antenna ports M to be less than L in the cmWave or mmWave system, where L can be from tens up to hundreds. Power consumption of TXU (excluding PA) is mainly due to DAC of which power consumption is linearly proportional to bandwidth and exponentially proportional to the number of ADC bits (P~B×22R; where B is bandwidth and R is bits per sample). Typically 16 bit ADCs are used e.g. in LTE. Thus, the power consumption of TXRU may limit the feasible number of TXRUs to be than L. For example, in LTE the number of TXUs (i.e. K) defines the maximum number of CSI-RS processes (or ports) that can be defined and measured by the UE.

The required number of antenna elements at the base station (BS) array for cmWave and mmWave systems range from tens to hundreds, or thousands, to overcome the increased path loss when going to higher carrier frequencies. Furthermore, the cmWave systems are expected to utilize bandwidths of hundreds of MHz up to GHz while mmWave are expected to utilize few GHz. Extremely large bandwidths together with high number of antenna elements may in practice prevent full digital transceiver architecture at the BS in which each antenna element would have its own TRX unit (TXRU) due to the cost and energy consumption of the TXRUs even though the full digital architecture may provide the best performance and flexibility.

Thus, one practical approach is to consider a hybrid architecture as discussed above, where the number of antenna elements is higher than the number of TXRUs and thus higher than a number of digital inputs. Each TXRU would be connected to multiple antenna elements via RF beamforming network. The system consists then both of digital and RF/analog beamforming systems which may be referred to as hybrid transceiver architecture.

The use of hybrid architecture may introduce transmission and reception restrictions onto the control signalling transmissions (such as downlink synchronization signal, broadcast channel (i.e. system information in general)) and reception at the BS where the system utilizes large operating bandwidth (e.g. 100 MHz to 1 GHz).

In general, in the hybrid system there are as many RF beams available than there are TXRUs and thus both in downlink and uplink direction typically the whole angular domain of the sector cannot be covered at once but rather in multiple time slots when RF beams are more narrow than sector beams. Narrow, high gain beams may be needed when going towards mmWave carrier frequencies to meet the required link budgets. Moreover, the larger the operating bandwidth the more expensive is the TXRU in terms of power consumption and price. Power consumption of high accuracy ADCs may limit the number of TXRUs and CSI-RS ports to be less than then number of antenna elements which may lead to sequential sounding if per antenna element measurement is desired.

Thus, for systems operating in high carrier frequencies (cmWave and mmWave frequencies) with system bandwidths ranging from hundreds of MHz up to some GHz, the affordable number of TXRUs may be relatively low (e.g. 2-16). The high carrier frequencies and large system bandwidths set restrictions on downlink transmissions and uplink reception since the processing can be done to and from the directions current RF beams are pointing to. Especially in uplink direction, overhead and latency from small payload control channel transmissions may be significant in a cell where a high number of UEs are to be served.

For instance, determining the RF beams for a certain UE based on uplink signals may require extensive search resulting in a delay because each potential direction needs to be tried. The same applies e.g. for receiving a PRACH preamble for a UE without any a priori information about suitable RF beam(s).

Alternatively, as the number of CSI-RS ports may be less than the number of antenna elements, virtualization between CSI-RS ports and antenna elements is needed in which CSI-RS signal is transmitted via multiple antenna elements. That would lead to grid of beams (GoB) type solution where one CSI-RS is associated with a pre-configured beam.

CSI-RS transmissions may be transmitted in a beam based manner as well in which CSI-RS are precoded to form CSI-RS beams. When CSI-RS transmissions are transmitted via high accuracy TXRUs, the number of simultaneous CSIs transmissions are limited due to cost issue of high accuracy TXRUs.

For instance the hybrid beamforming system operates in beam domain. Baseband capability and cost of high accuracy ADCs set the limit for how many beams can be processed at a time. In case of uncertainty of arrival angles, the base station has to utilize relatively wide beams (analog domain beamforming). This decreases the UL performance since the entire beamforming potential cannot be exploited (hence, the beams cannot be steered with narrow angle towards the arriving signals). This is an inherent feature in the hybrid beamforming system where the number of high accuracy RXUs is limited. Alternatively, the hybrid beamforming system may operate with narrow beams in uplink but with the cost of higher latency and overhead because of a need for beamforming training for the RF beams per each UE. Beamforming training from a BS point of view means finding suitable RF beams towards a certain UE. The search means trying one beam direction at a time which may lead to increased latency and overhead.

Similarly, latency for scheduling request transmission is increased because number of UEs multiplexed within the same uplink symbol is practically limited by the number of transceiver units in hybrid architecture.

Figure 7:
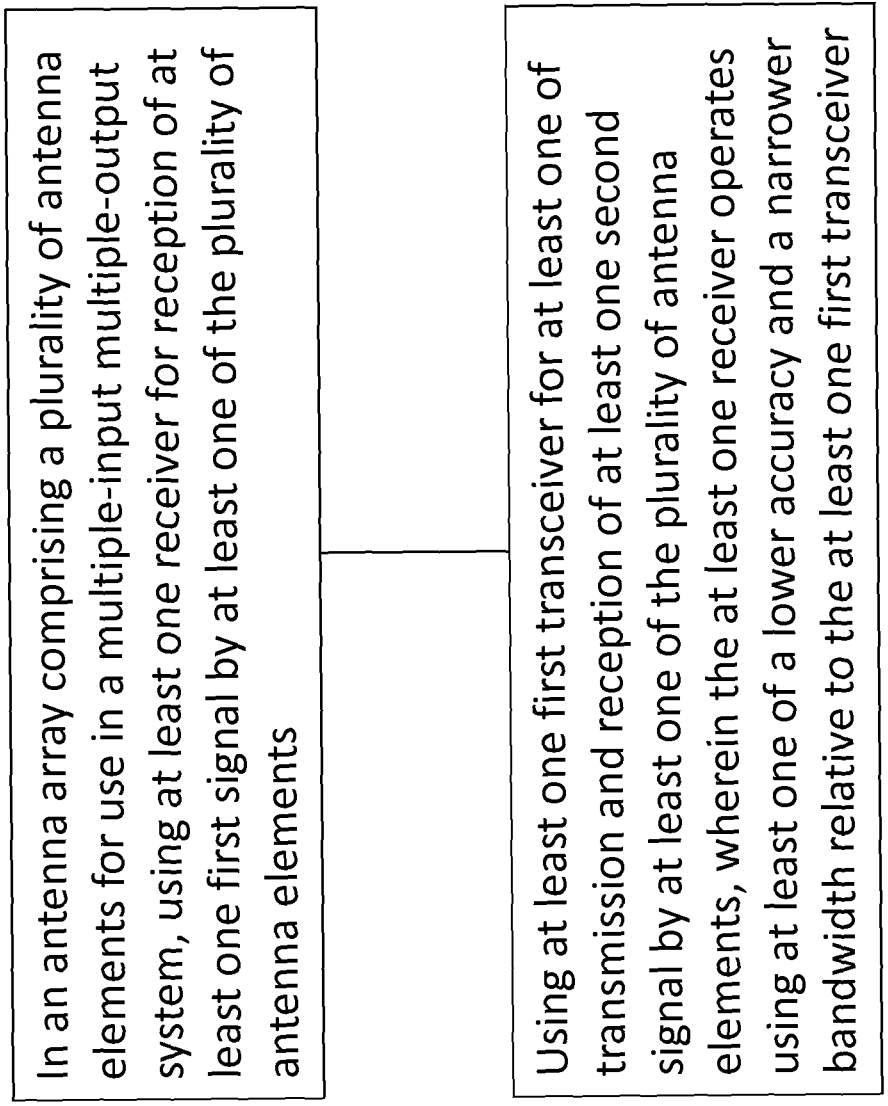
FIG. 7 shows a flowchart of an example method.

FIG. 7 shows an example method of using an antenna array in a MIMO system. In a first step the method comprises, in an antenna array comprising a plurality of antenna elements for use in a multiple-input multiple-output system, using at least one receiver for reception of at least one first signal by at least one of the plurality of antenna elements.

In a second step the method comprises using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

The method may comprise using at least one transmitter for transmission of at least one first signal by at least one of the plurality of antenna elements, wherein the at least one transmitter operates using at least one of a lower accuracy and a narrower bandwidth relative to the at least one first transceiver. The at least one transmitter may operate using a lower maximum power than the at least one first transceiver. The at least one transmitter and the at least one receiver may be combined into at least one second transceiver which operates using at least one of a lower accuracy and a narrower bandwidth relative to the at least one first transceiver.

The at least one receiver may comprises a low accuracy receiver unit. The at least one transmitter may comprise a low accuracy transmitter unit. The at least one first transceiver may comprise a high accuracy transceiver unit. A low accuracy receiver unit may comprise a 1-bit DAC. A low accuracy transmitter unit may comprise a 1-bit ADC. A high accuracy transceiver unit may comprise, for example, a 14-bit or a 16-bit DAC and/or ADC. A high accuracy transceiver unit in a small cell apparatus may comprise a 12-bit ADC or DAC. The high accuracy transceiver may operate using system bandwidth. The low accuracy receivers and/or transmitters may have the same operating bandwidth as the system bandwidth.

Alternatively, or in addition, the at least one receiver may comprise a narrow bandwidth (NB) receiver unit. The at least one transmitter may comprise a NB transmitter unit. The at least one first transceiver may comprise a system bandwidth transceiver. That is, the NB transceiver operates using a bandwidth narrower than the system bandwidth. The actual bandwidth of the NB transceiver is a design parameter and may vary according to scenario.

Of the at least one receiver, the at least one transmitter and the at least one first transceiver, only the least one first transceiver may be used to transmit and receive scheduled user data. The at least one first signal may be an antenna signal. The at least one second signal may be a beam signal. Antenna signals may be defined as having a radiation pattern covering a cell, whereas beam signals have a radiation portion covering a portion of the cell.

Using at least one receiver for reception of at least one first signal by at least one of the plurality of antenna elements may comprise receiving uplink signal(s) using a low accuracy and/or narrow band receiver unit. The uplink signals may be used for receiving control information and/or deriving direction information to be used by high accuracy and/or system bandwidth TXRUs for reception and/or transmission.

The at least one first signal may comprise at least one of physical control channels and reference signals. For example, the physical control channels may be data non-associated control signals such as PRACH preamble, scheduling request, HARQ-ACK and CQI. Reference signals may be reference signals relating to channel sounding (SRS), demodulation reference signals (DMRS) and CSI measurement (CSI-RS). In one example, the at least one first signal may comprise non-precoded CSI-RS. The at least one first signal may comprise a constant envelope sounding signal such as CSI-RS, uplink SRS and/or uplink DMRS.

The at least one second signal may comprise signals related to scheduled user data signals for example, reference signals used for coherent detection of data may be part of a the second single. Precoded CSI-RS at be part of the at least one second signal. The at least one second signal may comprise certain controls signals, e.g. PDCCH triggering DL grant.

In an example embodiment, low accuracy transceivers (TXRU) (comprising a low accuracy receiver and a low accuracy transmitter) are introduced along with the typical high accuracy TXRUs.

The low accuracy TXRU, using 1-bit ADCs (one for I and one for Q), may be utilized to transmit/receive phase information. Using low accuracy TXRU to transmit and/or receive phase information may allow transmission of signals such as CSI-RS, and reception of signals such as SRS and DMRS, used in LTE.

Using at least one receiver for reception of at least one first signal by at least one of the plurality of antenna elements may comprise using low accuracy receivers or reception of e.g. constant envelope sounding signals such as uplink SRS and/or DMRS. Low accuracy transmitters may be used for transmission of e.g. constant envelope sounding signals such as CSI-RS. Such signals may be generated from CAZAC sequences.

Another example may be to transmit and/or receive physical control channels via low accuracy transmitters/receivers, respectively. It may be beneficial to limit the usage of low accuracy TXU into scenarios involving only single carrier transmission (or serial modulation) which may maximize the power efficiency of low accuracy TXU.

In uplink, e.g. sounding reference signals, UE specific demodulation reference symbols (DMRS) or the like, may be used for sounding the channel and/or to obtain direction of arrival information of the signals. These signals may be received at the BS via low accuracy RXUs. Based on estimated channel and direction information from these received signals, the BS may generate the data reception and transmission beams using the high accuracy RXUs and TXUs, respectively.

From a UE point of view, the BS may be seen as a "fully digital" beamforming system where a digital domain degree equals to the number of CSI-RS ports/beams in use.

Low accuracy TXRUs may be used for antenna synchronization. The method may comprise causing transmission of at least one antenna specific signal, using the at least one transmitter. In other words, a DL signal may be transmitted via a low accuracy transmitter. The low accuracy transmitter may be associated with one antenna/antenna element. The DL signal may be received and measured via another low accuracy receiver associated with another antenna(s)/antenna element(s). Power consumption for antenna synchronization purpose may be negligible due to the use of low accuracy ADCs. Low accuracy TXRUs at one base station may be used for estimating the channel towards the other base station(s).

The at least one receiver (or transceiver operating using at least one of a lower accuracy and a narrower bandwidth relative to the at least one first transceiver) may be associated with a respective one of the plurality of antenna elements. The number of the receivers (or transceivers operating using at least one of a lower accuracy and a narrower bandwidth relative to the at least one first transceiver) may be greater than the number of the first transceivers, and the number of antenna elements is greater than or equal to the number of the number of the receivers.

Figure 8:
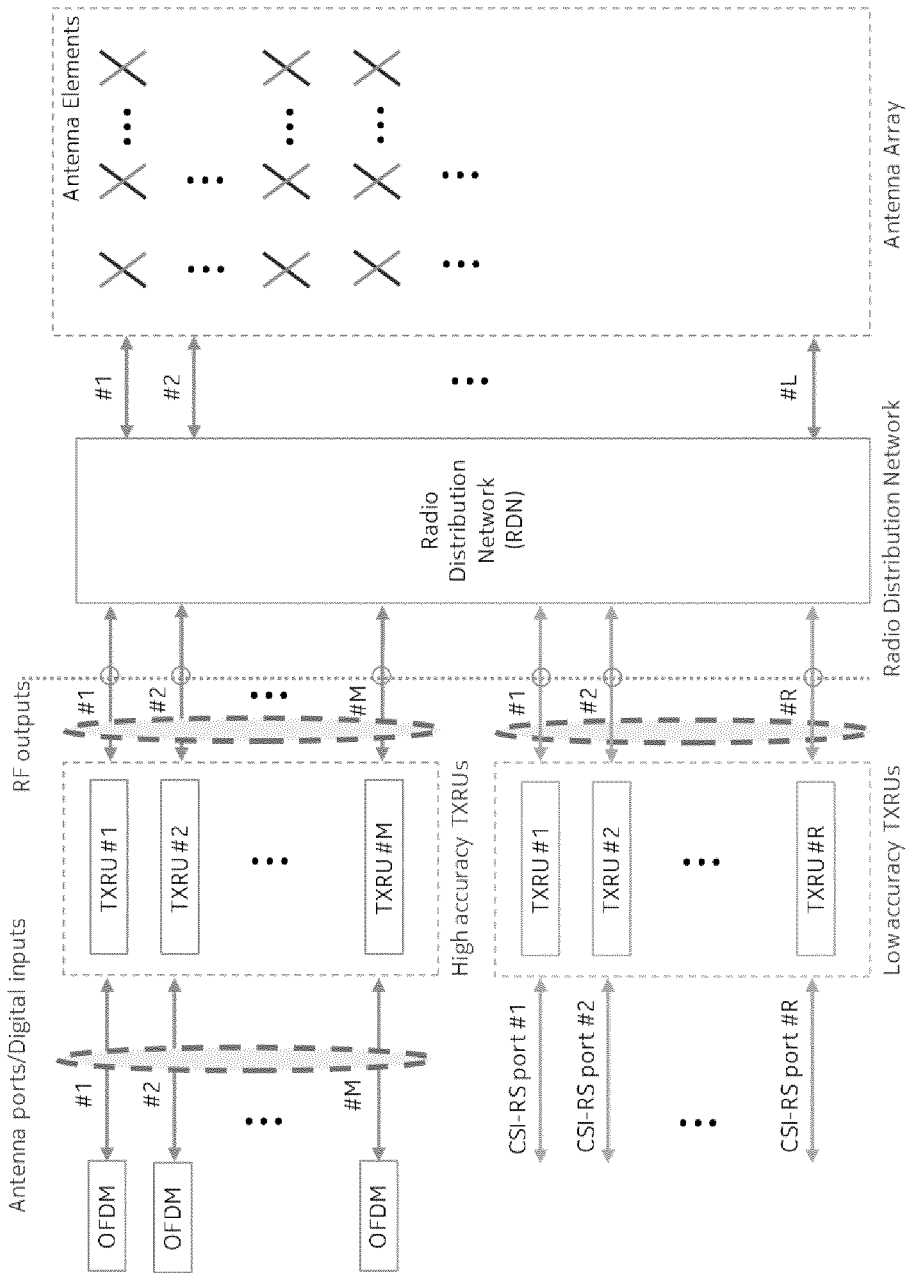
FIG. 8 shows an example architecture combining high and low accuracy TXRUs.

FIG. 8 shows a schematic illustration of an embodiment for an example system in which R number of low accuracy TXRUs are introduced for CSI-RS transmissions and the low accuracy TXRUs are assumed to have the same operating bandwidth as the system bandwidth. Each CSI-RS port may be connected to one low accuracy TXRU and R≤L, where L is the number of antenna elements. In a typical scenario M<<R, where M is the number of antenna ports.

In one embodiment, R is equal to L, and thus each antenna element is associated with a CSI-RS port. Transmission of CSI-RSs over R CSI-RS ports may be time multiplexed with data channel transmissions over antenna ports M. Depending on the Radio Distribution Network implementation, frequency domain multiplexing (FDM) may be possible.

R may be equal to L from a power consumption perspective. Thus, for sounding purposes, both in downlink and uplink, all the antenna elements maybe measured in parallel and sequential sounding can be avoided.

In an embodiment, R<L (i.e. only certain antenna elements are equipped with 1-bit ADCs). A trade-off between cost/complexity with the performance/accuracy achievable by the parallel TXRU chain may be achieved.

The proposed architecture may reduce the cost and energy efficiency compared to a fully digital approach. The proposed architecture may allow flexible Massive MIMO operation (comparable to fully digital approach) with reasonable number of high accuracy TXRU. With equal number of high accuracy TXRUs, the proposed architecture may provide considerable performance improvement compared to the baseline hybrid approach.

In one example embodiment, NB transceiver units may be introduce alongside system bandwidth transceivers units. The narrow bandwidth transceiver may be used for narrow bandwidth control signalling and/or reference signals Each antenna element or each antenna element of a subset of all antenna elements may be associated, e.g. equipped or connected with, a narrow bandwidth transceiver unit Transceivers operating with system bandwidth may be used for downlink transmission and/or uplink data reception. Each system bandwidth transceiver may be associated or connected to a set of antenna elements, where the set size may be from tens to hundreds of antenna elements. The number of system bandwidth transceivers may be less or much less than above mentioned narrow bandwidth transceivers Certain physical control channels and signals may be transmitted and/or received using narrow bandwidth TXRUs. Channels and signals applying NB transmission and/or reception may comprise uplink physical random access channel (PRACH), uplink scheduling request signalling, beam tracking signal (such as sounding reference signal (SRS) in uplink and channel state information reference signal (CSI-RS) in downlink) and HARQ ACK/NACK and CQI.

The location in frequency domain in the system bandwidth for the narrow bandwidth signals may vary from one time to the other.

Each NB transmission may consist of one or more transmission instants with different frequency position. This may gain frequency diversity for NB signals (if available in the radio channel).

Signal structures may be defined such that Wideband signals and Narrowband signals can be separated in different domains (such as time/frequency/space). Depending on the configuration, BS may be able to transmit/receive NB signals during the same modulation symbols. For example, certain UL control symbol may consist of both signals occupying the system bandwidth and signals with narrow bandwidth.

Narrow bandwidth transceivers associated with the antenna elements or a set of antenna elements may be lower accuracy transceivers, e.g. using a constant envelope transmission scheme such as that described herein.

Figure 9:
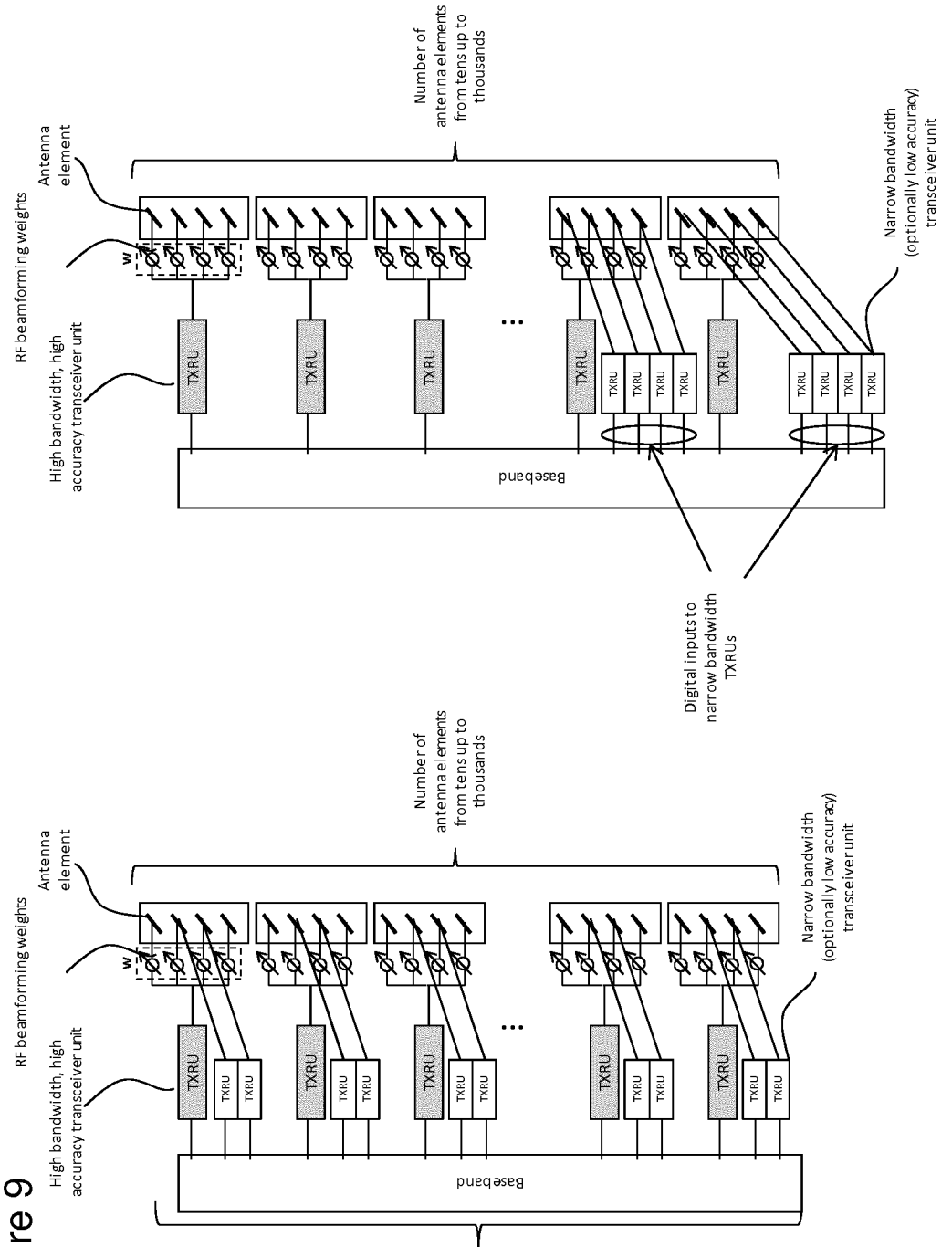
FIG. 9 shows an example architecture combining high bandwidth and narrow bandwidth TXRUs

FIG. 9 shows a first and second alternative of an example transceiver architecture. Sub-array transceiver unit to antenna element virtualization is applied, i.e. that one antenna element can be connected to one TXRU only. Sub-array structures in the figure formed from one column of antenna elements in vertical dimension is one implementation. Another possible implementation may be, for example, 2-dimensional uniform planar array per sub-array. Narrow bandwidth TXRUs may be connected to antenna elements across all sub-arrays as in alternative 1 or connected to antenna elements concentrating to certain sub-arrays as in alternative 2.

In an embodiment, narrow bandwidth TXRUs may have their own physical antenna elements. That is, R may be equal to L from a power consumption perspective, wherein R is the number of NB transceivers and L is the number of antenna elements. Thus, for sounding purposes, both in downlink and uplink, all the antenna elements maybe measured in parallel and sequential sounding can be avoided.

In an embodiment, R<L (i.e. only certain antenna elements are equipped with narrow band TRXUs). A trade-off between cost/complexity with the performance/accuracy achievable by the parallel TXRU chain may be achieved.

In an example embodiment, using at least one receiver for at least reception of at least one first signal by at least one of the plurality of antennas may comprise a BS using narrow bandwidth receivers to receive PRACH, scheduling request, HARQ ACK/NACK, beam tracking signal, and other control signalling from UEs. Physical channels from which the BS receives using narrow bandwidth transceivers may be multiplexed with other physical channels transmitted by UEs and received by the BS using large bandwidth transceivers within a same time instant/symbol.

Beam forming for downlink and uplink data transmission may be based on uplink beam tracking signal. Using at least one receiver for at least reception of at least one first signal by at least one of the plurality of antenna elements may comprise receiving a beam tracking signal. In uplink, the beam tracking signal is a narrowband signal that may be received by the BS using narrow bandwidth receivers. This may allow receiving the signal from the number of UEs parallel where the number of parallel UEs is limited by the multiplexing capacity of the beam tracking signal on a given transmission bandwidth rather than limited by the number of TXRUs at the BS.

BS may make DoA estimation based on uplink beam tracking signal and may perform beamforming for downlink (TDD system and reciprocity assumed) and uplink data transmission using large bandwidth TXRUs based on that estimation.

Using at least one receiver for reception of at least one first signal by at least one of the plurality of antenna elements may comprise a BS receiving scheduling requests (SR) from UEs using narrow bandwidth receivers. SR signal is a narrowband signal.

Similar to uplink beam tracking signal, receiving SR using narrow bandwidth may allow receiving the signal from the number of UEs in parallel where the number of parallel UEs is limited by the multiplexing capacity of the beam tracking signal on a given transmission bandwidth rather than limited by the number of TXRUs at the BS.

Using at least one transmitter for transmission of the at least one first signal by at least one of the plurality of antenna elements may comprise a BS using narrow bandwidth transceivers to transmit downlink common control such as synchronization signal(s) and broadcast channel that are narrowband signals. For example, where there is no load in the cell, the cell may transmit periodically only these narrowband essential downlink signals for the UE to be able to perform initial access. In that transmission mode, the BS may switch off components and circuits related to large bandwidth transceiver units and use only narrow bandwidth transceiver units. This may allow reduction of UE power consumption (if same principle is applied at the UE end).

Overhead and latency related to reception of uplink control channels and signalling like PRACH and SR may be reduced. Overhead may be reduced reduction in beam tracking processing based on uplink signals because all the signal directions can be sampled at once. UE power consumption may be reduced if monitoring of Downlink Control Information can be made using Narrowband TXRU.

Although the provision of low accuracy transceiver units and NB transceiver units have been described with reference to separate embodiments, these approaches may be combined. For example, NB TXRUs may be low accuracy TXRUs. Alternatively, or in addition, NB TXRUs may be provided alongside low accuracy TXRUs.

The embodiment have been described with reference to an antenna array of a network. However, embodiments, may be applicable to an antenna array of a user device. For example, a method may comprise, at a user device having a plurality of antenna elements for use in a multiple-input multiple-output system, using at least one transmitter for transmission of at least one first signal by at least one of the plurality of antenna elements and using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

The method may comprise using at least one receiver for receiving at least one first signal by at least one of the plurality of antenna elements, wherein the at least one receiver operates using at least one of a lower accuracy and a narrower bandwidth relative to the at least one first transceiver.

It should be understood that each block of the flowcharts of the Figures and any combination thereof may be implemented by various means or their combinations, such as hardware, software, firmware, one or more processors and/or circuitry.

Figure 10:
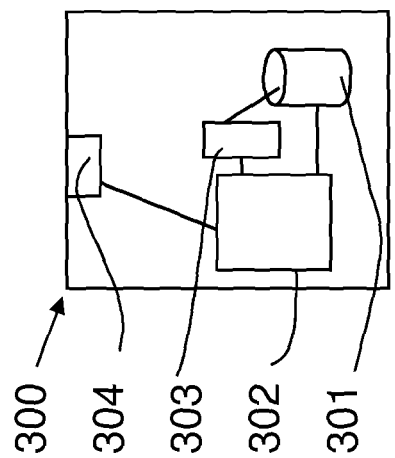
FIG. 10 shows a schematic diagram of an example control apparatus.

The method may be implemented on a mobile device as described with respect to FIG. 2 or control apparatus as shown in FIG. 10. FIG. 10 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 201 can be configured to execute an appropriate software code to provide the control functions. Control functions may comprise, in an antenna array comprising a plurality of antenna elements for use in a multiple-input multiple-output system, using at least one receiver for reception of at least one first signal by at least one of the plurality of antenna elements and using at least one first transceiver for at least one of transmission and reception of at least one second signal by at least one of the plurality of antenna elements, wherein the at least one receiver operates using at least one of a lower accuracy and a narrower bandwidth relative to the at least one first transceiver.

Alternatively or in addition, control functions may comprise at a user device having a plurality of antenna elements for use in a multiple-input multiple-output system, using at least one transmitter for transmission of at least one first signal by at least one of the plurality of antenna elements and using at least one first transceiver for at least one of transmission and reception of at least one second signal by at least one of the plurality of antenna elements, wherein the at least one transmitter operates using at least one of a lower accuracy and a narrower bandwidth relative to the at least one first transceiver.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to cmWave frequencies (3-30 GHz) and mmWave frequencies, similar principles maybe applied in relation to other networks and communication systems, including MIMO with different carrier frequencies. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
    in an antenna array comprising a plurality of antenna elements for use in a multiple-input multiple-output system, using at least one receiver for reception of at least one first signal by at least one of the plurality of antenna elements; and
    using at least one first transceiver for at least one of beamformed transmission and beamformed reception of at least one second signal by at least one of the plurality of antenna elements,
    wherein the at least one receiver covers a larger area than the at least one first transceiver and operates using a narrower bandwidth relative to the at least one first transceiver,
    wherein of the at least one receiver and the at least one first transceiver, only the at least one first transceiver is used to transmit and receive scheduled user data and the at least one receiver is used to provide a different channel for receiving control signals on the larger area, and
    wherein the control signals received by the at least one receiver using the narrower bandwidth and covering the larger area are used for controlling operation of the at least one first transceiver.

2. The method according to claim 1, comprising using at least one transmitter for transmission of at least one first signal by at least one of the plurality of antenna elements, wherein the at least one transmitter operates using at least one of a lower accuracy and a narrower bandwidth relative to the at least one first transceiver.

3. The method according to claim 2, wherein of the at least one receiver, the at least one transmitter and the at least one first transceiver, only the at least one first transceiver is used to transmit and receive scheduled user data.

4. The method according to claim 1, wherein the at least one first signal comprises at least one of physical control channels and reference signals.

5. The method according to claim 4, wherein the at least one of reference signals and a physical control channels comprises at least one of uplink sounding reference signals, uplink channel state information reference signals, uplink demodulation reference signals, uplink physical random access channel, uplink scheduling request signalling, hybrid automatic repeat requests acknowledgment and channel quality information.

6. The method according to claim 2, comprising causing transmission of at least one antenna specific signal, using the at least one transmitter.

7. The method according to claim 1, comprising using the at least one first signal for at least one channel estimation towards a base station and antenna synchronisation with the base station.

8. The method according to claim 1, wherein the at least one receiver comprises a 1-bit analog-to-digital converter.

9. The method according to claim 2, wherein the at least one transmitter comprises a 1-bit digital-to-analog converter.

10. The method according to claim 2, wherein the at least one transmitter operates using a lower maximum power than the at least one first transceiver.

11. The method according to claim 1, wherein the number of the receivers is greater than the number of the first transceivers, and the number of antenna elements is greater than or equal to the number of the receivers.

12. The method according to claim 1, wherein the at least one receiver is associated with a respective one of the plurality of antenna elements.

13. The method according to claim 1, wherein the at least one first signal comprises antenna signals.

14. The method according to claim 13, wherein the antenna signals have a radiation pattern covering a cell and wherein the beamformed signals have a radiation portion covering a portion of the cell.

15. The method according to claim 1, wherein the at least one first signal comprises constant envelope sounding signals.

16. A non-transitory computer-readable storage medium comprising instructions stored thereon that, when executed by at least one processor, are configured to cause a computing system to perform the method of claim 1.

17. A method comprising:
at a user device having a plurality of antenna elements for use in a multiple-input multiple-output system, using at least one transmitter for transmission of at least one first signal by at least one of the plurality of antenna elements; and
using at least one first transceiver for at least one of transmission and reception of at least one second signal by at least one of the plurality of antenna elements,
wherein the at least one transmitter operates using a narrower bandwidth relative to the at least one first transceiver for transmission to at least one receiver covering a larger area than the at least one first transceiver,
wherein of the at least one transmitter and the at least one first transceiver, only the at least one first transceiver is used to transmit and receive scheduled user data and the at least one transmitter is used to provide a different channel using the narrower bandwidth for transmitting control signals on the larger area for use by the at least one receiver.

18. An apparatus comprising:
at least one processor and at least one memory including a computer program code, the at least one memory and the computer program code configured to, with the at least one processor, cause the apparatus at least to:
in an antenna array comprising a plurality of antenna elements for use in a multiple-input multiple-output system, use at least one receiver for reception of at least one first signal by at least one of the plurality of antenna elements; and
use at least one first transceiver for at least one of beamformed transmission and beamformed reception of at least one second signal by at least one of the plurality of antenna elements,
wherein the at least one receiver covers a larger area than the at least one first transceiver and operates using a narrower bandwidth relative to the at least one first transceiver,
wherein of the at least one receiver and the at least one first transceiver, only the at least one first transceiver is used to transmit and receive scheduled user data and the at least one receiver is used to provide a different channel for receiving control signals on the larger area, and
wherein the control signals received by the at least one receiver using the narrower bandwidth and covering the larger area are used for controlling operation of the at least one first transceiver.

19. An apparatus comprising:
at least one processor and at least one memory including a computer program code, the at least one memory and the computer program code configured to, with the at least one processor, cause the apparatus at least to:
use, by a user device having a plurality of antenna elements for use in a multiple-input multiple-output system, at least one transmitter for transmission of at least one first signal by at least one of the plurality of antenna elements; and
use at least one first transceiver for at least one of transmission and reception of at least one second signal by at least one of the plurality of antenna elements,
wherein the at least one transmitter operates using a narrower bandwidth relative to the at least one first transceiver for transmission to at least one receiver covering a larger area than the at least one first transceiver, and
wherein of the at least one transmitter and the at least one first transceiver, only the at least one first transceiver is used to transmit and receive scheduled user data and the at least one transmitter is used to provide a different channel using the narrower bandwidth for transmitting control signals on the larger area for use by the at least one receiver.

* * * * *